United States Patent
Kim et al.

(10) Patent No.: US 7,002,814 B2
(45) Date of Patent: Feb. 21, 2006

(54) POWER SUPPLY CONTROLLING DEVICE OF AN ELECTRONIC EQUIPMENT

(75) Inventors: Jung-hwan Kim, Youngin (KR); Kyung-chool Choi, Suwon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 10/619,604

(22) Filed: Jul. 16, 2003

(65) Prior Publication Data

US 2004/0017112 A1   Jan. 29, 2004

(30) Foreign Application Priority Data

Jul. 23, 2002   (KR) ................ 2002-43416

(51) Int. Cl.
*H02M 3/335* (2006.01)
(52) U.S. Cl. ............ 363/21.15; 399/88; 710/313; 713/320; 713/324
(58) Field of Classification Search ............... 399/37, 399/70, 88; 363/21.12, 21.15, 21.18; 710/313; 713/300, 320, 323, 324, 340
See application file for complete search history.

(56) References Cited

U.S. PATENT DOCUMENTS

| | | | | |
|---|---|---|---|---|
| 5,167,024 A | * | 11/1992 | Smith et al. ............... | 713/322 |
| 5,799,196 A | * | 8/1998 | Flannery ................... | 713/320 |
| 5,835,136 A | * | 11/1998 | Watanabe et al. .......... | 348/231.9 |
| 5,995,397 A | * | 11/1999 | Kim ........................... | 363/97 |
| 6,088,244 A | * | 7/2000 | Shioya et al. .............. | 363/21.07 |
| 6,093,916 A | * | 7/2000 | Toyoizumi ................. | 219/501 |
| 6,252,783 B1 | * | 6/2001 | Huh et al. .................. | 363/21.01 |
| 6,275,949 B1 | * | 8/2001 | Watanabe ................... | 713/324 |
| 6,407,734 B1 | * | 6/2002 | Komine et al. ............. | 345/212 |
| 6,408,148 B1 | * | 6/2002 | Yamamoto .................. | 399/88 |
| 6,662,301 B1 | * | 12/2003 | Sekine et al. ............... | 713/320 |
| 6,671,814 B1 | * | 12/2003 | Kubo et al. ................. | 713/324 |
| 6,674,271 B1 | * | 1/2004 | Choo et al. ................. | 323/282 |
| 6,782,484 B1 | * | 8/2004 | McGowan et al. ......... | 713/323 |
| 6,801,730 B1 | * | 10/2004 | Johnson et al. ............. | 399/75 |
| 6,907,492 B1 | * | 6/2005 | Matsuda et al. ............ | 710/313 |
| 6,909,616 B1 | * | 6/2005 | Kim ........................... | 363/16 |
| 6,928,562 B1 | * | 8/2005 | Cohen et al. ............... | 713/320 |

* cited by examiner

*Primary Examiner*—Gary L Laxton
(74) *Attorney, Agent, or Firm*—Staas & Halsey LLP

(57) ABSTRACT

A system connecting a printer and a host computer includes a signal processing unit, a printing unit, a DC/DC converter converting a power supply voltage into a lower voltage required by the signal processing unit and outputting the converted voltage to the signal processing unit, an input unit receiving a printing command, and a power supply controlling device. The power supply controlling device includes a first switching unit, a pulse width modulating unit, a power supply switch providing a power on/off signal from a user, and a power supply controlling unit outputting a control signal to the pulse width modulating unit to control the first switching unit to perform an on/off operation corresponding to the power on/off signal from the user.

25 Claims, 2 Drawing Sheets

POWER SUPPLY CONTROLLING DEVICE OF AN ELECTRONIC EQUIPMENT

CROSS-REFERENCE TO RELATED APPLICATIONS

This application claims the benefit of Korean Application No. 2002-43416, filed Jul. 23, 2002, in the Korean Intellectual Property Office, the disclosure of which is incorporated herein by reference.

BACKGROUND OF THE INVENTION

1. Field of the Invention

The present invention relates to a power supply controlling device of an electronic equipment, and more particularly, relates to a power supply controlling device of an electronic equipment capable of controlling power which is supplied thereto.

2. Description of the Related Art

A printer is a device for printing data received from a computer connected thereto onto sheets using ink or toner, etc.

However, because the printer is utilized only when performing a printing operation on the printing data, the printer consumes undesirable power when not performing the printing operation in a power-on status.

Furthermore, because a power supply of a conventional printer is not turned off even when the printer is turned off, some parts or the entire printer are continuously supplied with power. Accordingly, in order to reduce power consumption when the printer does not perform the printing operation, the printer is switched into a sleep mode in which the printer parts necessary to perform the printing operation are supplied with a lower power than the power required by the printer parts. However, also in this case, the power consumption occurs.

To overcome the above problems, the conventional printer includes a power supply switch (not shown) at a primary side of a power supply unit to supply the power to the printer, and to minimize undesirable power consumption by operating the power supply switch when the printer is not operated. However, supplying the power supply switch is not cost efficient because the power supply switch that needs to be provided should withstand an input of a few hundreds volts.

SUMMARY OF THE INVENTION

According to an aspect of the present invention, there is provided a power supply controlling device of an electronic equipment, which can reduce a withstanding voltage of a switch capable of performing an on/off operation to supply power to the electronic equipment and can reduce a power consumption of the electronic equipment when the electronic equipment is not operated.

Additional objects and/or advantages of the invention will be set forth in part in the description which follows and, in part, will be obvious from the description, or may be learned by practice of the invention.

According to an aspect of the present invention, there is provided a power supply controlling device of the electronic equipment according to the present invention includes: a first rectifying unit rectifying an alternating voltage supplied from a power supply cord and outputting a first rectified voltage; a transformer including a primary winding wired to receive the first rectified voltage from the first rectifying unit, and a secondary winding coupled to the primary winding; a first switching unit performing an on/off operation by supplying current to the primary winding; a second rectifying unit rectifying a voltage induced by the secondary winding of the transformer and outputting a second rectified voltage; a pulse width modulating unit controlling the on/off operation of the first switching unit; and a power supply controlling unit outputting a signal controlling the pulse width modulating unit, wherein the pulse width modulating unit switches the first switching unit to on/off depending on a reception of a power-on signal which is supplied externally.

According to an aspect of the present invention, the power supply controlling unit includes: a USB interface unit; a power supply switch selecting a power on/off signal in response to a power on/off signal received from a host computer connected through the USB interface unit and outputting a trigger signal indicative thereof; a second switching unit connected to a power supply terminal of the USB interface unit and turned on based on the trigger signal from the power supply switch; and a photo coupler including a first light emitting device and a phototransistor applying a signal to the pulse width modulating unit, wherein the first light emitting device is connected to the second switching unit and disposed to emit the light in response to the turn-on signal of the second switching unit, and the signal corresponds to an emission of light emitting from the first light emitting device.

According to an aspect of the present invention, there is provided the power supply controlling device further includes: a second light emitting device connected in series between the phototransistor and the power supply leading-in terminal and between the power supply cord and the first rectifying unit; and a power supply sensing unit receiving the light emitting signal from the second light emitting device to sense the on/off status of the power supply switch, wherein the phototransistor is included to provide the pulse width modulating unit with a signal that corresponds to the emission of light emitting from the first light emitting device.

According to an aspect of the present invention, the power supply controlling device further includes an auxiliary power supply disposed on a power supply path from the power supply terminal of the USB interface unit to the second switching unit, and supplying the power to the second switching unit.

According to an aspect of the present invention, there is provided a power supply controlling device, including: a first switching unit; a pulse width modulating unit; a power supply switch providing a power on/off signal from a user; and a power supply controlling unit outputting a control signal to the pulse width modulating unit to control the first switching unit to perform an on/off operation corresponding to the power on/off signal from the user.

According to an aspect of the present invention, there is provided a system connecting a printer and a host computer, including: a signal processing unit; a printing unit; a DC/DC converter converting a power supply voltage into a lower voltage required by the signal processing unit, and outputting the converted voltage to the signal processing unit; an input unit receiving a printing command; and a power supply controlling device including a first switching unit, a pulse width modulating unit, a power supply switch providing a power on/off signal from a user, and a power supply controlling unit outputting a control signal to the pulse width modulating unit to control the first switching unit to perform an on/off operation corresponding to the power on/off signal from the user.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Figure 1:
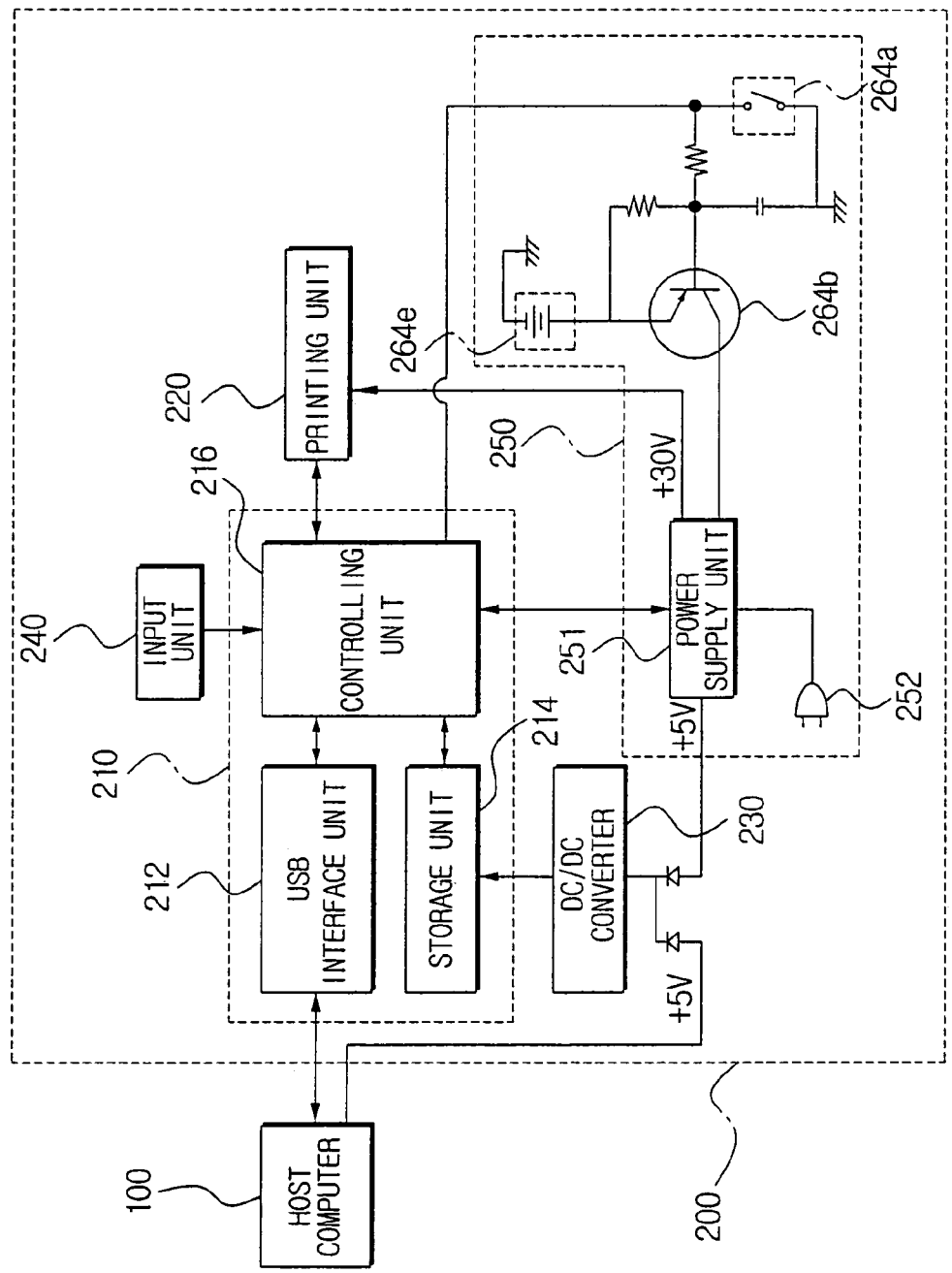
FIG. 1 is a block diagram of a printer system including a power supply controlling device, according to an aspect of the present invention.

Reference will now be made in detail to the aspects of the present invention, examples of which are illustrated in the accompanying drawings, wherein like reference numerals refer to like elements throughout. The aspects are described below in order to explain the present invention by referring to the figures.

FIG. 1 is a block diagram of a printer system including a power supply controlling device, according to an aspect of the present invention.

With reference to FIG. 1, the printer system includes a host computer 100 and a printer 200.

The host computer 100 transmits printing data to the printer 200, a signal to control the printer 200 such as a printing command, and a predetermined amount of power to drive a signal processing unit 210 of the printer 200.

The printer 200 performs a printing operation of the printing data in response to the printing command received from the host computer 100.

The printer 200 includes the signal processing unit 210, a printing unit 220, a DC/DC converter 230, an input unit 240, and a power supply controlling device 250.

The signal processing unit 210 includes a USB interface unit 212, a storage unit 214, and a controlling unit 216, and controls operations of the printer 200. A driving voltage to operate the signal processing unit 210 is approximately +2.5V to +3.3V.

The USB interface unit 212 functions as a connecting unit between the printer 200 and the host computer 100, and generally is connected to parallel ports of the host computer 100. The USB interface unit 212 includes a data line carrying the printing data from the host computer 100 and a power supply line which is supplied with the predetermined power.

The USB interface unit 212 receives the printing data and a signal through the data line, wherein the signal corresponds to the printing command of the printing data and various control commands such as a power on/off signal on the printer 200. Also, the USB interface unit 212 is supplied with a power supply of +5V necessary to drive the signal processing unit 210 through the power supply line from the host computer 100.

In the storage unit 214, the printing data and various programs necessary to perform the operations of the printer 200 are stored. The storage unit 214 includes a nonvolatile memory device, such as a ROM, in which various control programs necessary for implementing functions of the printer 200 are stored, and a volatile memory device, such as a RAM, in which different data occurring while performing the operations of the printer 200 are temporarily stored.

The DC/DC converter 230 converts the power supply voltage of +5V which is supplied from the host computer 100 or a power supply unit 251 into a voltage of +2.5V or 3.3V which is required by the signal processing unit 210, and outputs the converted voltage to the signal processing unit 210.

Consequently, it is possible to drive the signal processing unit 210 even if no power is supplied to the printer 200 because enough power is supplied to drive the signal processing unit 210 through the power supply line of the USB interface unit 212 connected to the host computer 100.

The printing unit 220 performs the printing operation of the printing data, which is received through the USB interface unit 212, under the control of the controlling unit 216. The printing unit 220 includes a printing head (not shown) to perform the printing operation, a head transport motor (not shown) to transport the printing head, and a printing head driving unit (not shown). The printing unit 220 is supplied with a driving voltage, approximately +30V, necessary for driving each of the above components from the power supply unit 251.

The input unit 240 includes a plurality of function keys (not shown) for receiving a user's select command for the printer 200, such as the printing command. The input unit 240 is mounted on a body of the printer 200 so that it can directly receive the select command from the user.

The power supply controlling device 250 determines whether the power is supplied to the printer 200 in response to the power on/off signal received from the power supply switch 264a or from the host computer 100, through the USB interface unit 212. The power supply switch 264a is placed on an outside of the printer body so that the user can operate the printer 200.

A detailed description on the power supply controlling device 250 shown in FIG. 1 will be explained with reference to FIG. 2.

Figure 2:
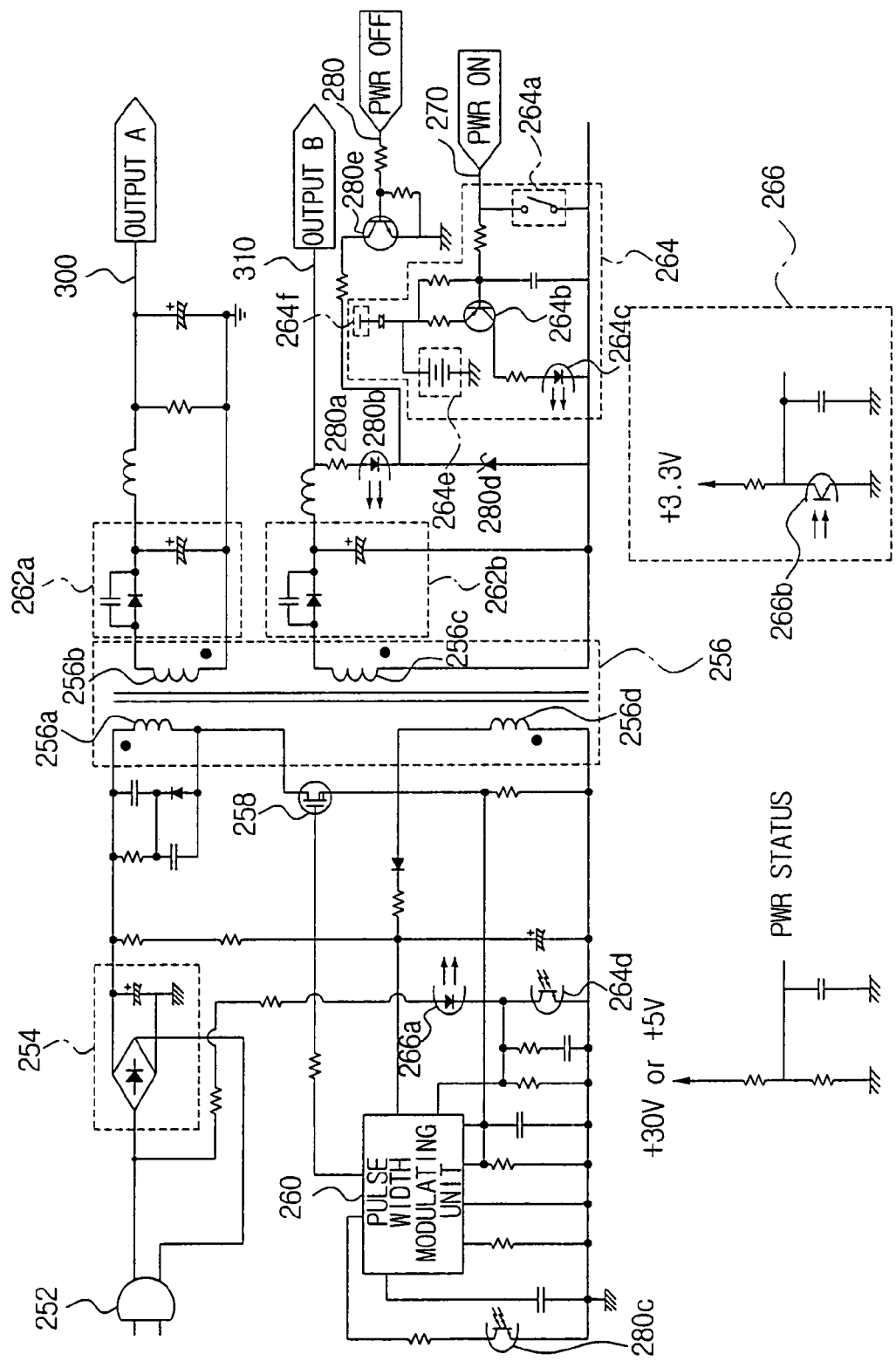
FIG. 2 is a detailed circuit diagram of the power supply controlling device shown in FIG. 1.

FIG. 2 shows a detailed circuit diagram of the power supply controlling device shown in FIG. 1.

With reference to FIG. 2, the power supply controlling device 250 includes a first rectifying unit 254, a transformer 256, a first switching unit 258, a pulse width modulating unit 260, a second rectifying unit 262a and 262b, and a power supply controlling unit 264.

The first rectifying unit 254 rectifies the alternating voltage applied through a power supply cord 252.

The transformer 256 comprises a primary winding 256a wired to receive the voltage rectified by the first rectifying unit 254, and three secondary windings 256b, 256c, and 256d coupled to the primary winding 256a. A number of the secondary windings may vary depending on a number of the voltage sources with different levels, which is required by the applicable electronic equipment.

The first switching unit 258 is provided to effect the on/off operation supplying the current to the primary winding 256a. As the first switching unit 258, a field effect transistor (FET) used as a high voltage switching device is applied.

The second rectifying unit 262a and 262b rectifies the voltages induced by the three second windings 256b, 256c, and 256d, respectively.

The power supply controlling unit 264 outputs a control signal to control the pulse width modulating unit 260 so that the unit 260 can switch on/off the first switching unit 258, depending on the reception of the power-on signal, which is supplied externally.

The power supply controlling unit 264 includes a power supply switch 264a, a second switching unit 264b, a photo coupler 264c and 264d, and an auxiliary power supply 264e.

The power supply switch 264a is placed to select the power on/off according to the user's operation.

The second switching unit 264b is connected to the power supply terminal 264f of the USB interface unit 212, and is turned on according to the selection of the power of the power supply switch 264a.

The second switching unit 264b may be configured to be turned on by using the power supplied from the auxiliary power supply 264e, as shown in FIG. 1. Further, the second switching unit 264b may be configured to be turned on by using the power supplied from the auxiliary power supply 264e and the power supply terminal 264f of the USB interface unit 212, as shown in FIG. 2.

The photo coupler 264c and 264d is connected to the second switching unit 264b, and includes a first light emitting device 264c for emitting a light in response to the turn-on operation of the second switching unit 264b and a phototransistor 264d for providing the pulse width modulating unit 260 with a signal that corresponds to the emission of light from the first light emitting device 264c.

The phototransistor 264d is turned on when the first light emitting device 264c emits the light.

The auxiliary power supply 264e is placed on the power supply path from the power supply terminal 264f of the USB interface unit 212 to the second switching unit 264b, and supplies the power to the second switching unit 264b. A secondary cell may be applied as the auxiliary power supply 264e.

The pulse width modulating unit 260 controls a duty ratio of the on/off operation of the first switching unit 258 depending on whether the phototransistor 264d constituting the photo coupler 264c and 264d is conducting.

In other words, if the power supply switch 264a is turned on, according to the user's operation, and a low signal which is output from the controlling unit 216, in response to the power-on signal input to the power-on terminal 270 indicated as PWR ON from the host computer 100, the second switching unit 264b is turned on.

When the first light emitting device 264c emits the light in response to the turn-on operation of the second switching unit 264b and the phototransistor 264d is turned on according to the emitted light, the pulse width modulating unit 260 is operated to generate the predetermined voltage. The pulse width modulating unit 260 induces the voltage of the primary side into the secondary side by controlling a duty ratio of the on/off operation of the first switching unit 258.

The pulse width modulating unit 260 can adjust the voltage of an output terminal 300 indicated as an OUTPUT A by controlling the duty ratio of the on/off operation of the first switching unit 258. The voltage induced in the output terminal 300 is the voltage necessary to drive the printing unit 220, which is typically +30V. Similarly, the pulse width modulating unit 260 can adjust the voltage of an output terminal 310 indicated as an OUTPUT B by controlling the duty ratio of the on/off operation of the first switching unit 258. The voltage induced in the output terminal 310 is the voltage necessary to drive the signal processing unit 210, which is typically +5V.

A power supply sensing unit 266 is arranged to receive the light emitting signals from the phototransistor 264d and a second light emitting device 266a, and can sense the on/off status of the power supply switch 264a. The phototransistor 264d is included to provide the pulse width modulating unit 260 with a signal that corresponds to the emission of light from the first light emitting device 264c. The second light emitting device 266a is connected in series with the power supply leading-in terminal between the power supply cord 252 and the first rectifying unit 254.

In other words, the power supply sensing unit 266 can sense the on/off status of the power supply switch 264a when the second light emitting device 266a, driven by the turn-on signal of the phototransistor 264d, emits the light. The second light emitting device 266a emits the light based on the voltage, which is induced from the power supply cord 252.

The power supply sensing unit 266 outputs the on/off sensing signal on the power supply switch 264a to the controlling unit 216, wherein the on/off sensing signal is sensed based on the turn on/off of the phototransistor 266b, which can be placed to receive the light emitted from the second light emitting device 266a.

The terminal 310 outputting the voltage rectified through the secondary winding 256c is connected to a resistor element 280a, a third light emitting device 280b including a photo coupler 280b and 280c, and a zener diode 280d, which are connected in series to form a current path. The photo coupler 280b and 280c along with the zener diode 280d is applied as a feedback circuit.

The zener diode 280d is turned on when the output terminal 310 reaches a predetermined target voltage value.

The pulse width modulating unit 260 controls the duty ratio of the on/off of the first switching unit 258, thereby stably maintaining the target voltage of the terminal 310.

In other words, if the voltage of the terminal 310 indicated as the OUTPUT B is higher than the predetermined value, the zener diode 280d is turned on and, thus, the third light emitting device 280b emits the light. At this point, the pulse width modulating unit 260 maintains turning off of the first switching unit 258 until the voltage outputted from the terminal 310 reaches to the predetermined target value, that is, the zener diode is turned off.

When the voltage output from the terminal 310 falls below the predetermined target value, that is, when the zener diode 280d is turned off, the third light emitting device 280b does not emit the light any more. At this time, the pulse width modulating unit 260 turns on the first switching unit 258. The above-referred to operations are repeated while controlling the duty ratio so that the voltage outputted from the terminal 310 is maintained at the predetermined target value.

On the other hand, when a power-off terminal 280 indicated as a PWR OFF is inputted with a high signal corresponding to the power off signal from the host computer 100 or the power supply switch 264a, a third switching unit 280e is turned on. Then, when the third light emitting device 280b emits the light based on the turn-on signal of the third switching unit 280e and a phototransistor 280c is turned on according to the emitted light, the pulse width modulating unit 260 turns off the first switching unit 258.

Accordingly, when the power-off terminal 280 is inputted with a signal corresponding to the power-off signal and the third switching unit 280e is turned on, the first switching unit 258 is turned off regardless of the voltage and a load of each of the terminals 300 and 310, thereby substantially interrupting supply of the power to the terminals 300 and 310.

When the controlling unit 216 is powered on according to the voltage to drive the signal processing unit 210, the controlling unit 216 controls the entire operations of the printer 200 based on the programs stored in the storage unit 214.

The controlling unit 216 confirms a power status (PWR STATUS) of the printer 200 upon determining the voltages outputted from the terminals 300 and 310. The controlling unit 216 determines whether each of the signals outputted from the terminals 300 and 310 of the power supply controlling device 250 is high or low. Then, the controlling unit 216 determines that the power supply status of the printer 200 is a power-on status if the output signal is high or a power-off status if the output signal is low.

If the power supply of the printer 200 is in the off status, the controlling unit 216 is switched into a sleep mode maintaining the receiving standby status until the controlling unit 216 receives the printing data or a signal corresponding to the power-on signal, that is, until the printer 200 is operated externally.

When the controlling unit 216 receives the power-on signal in response to the operation of the power supply switch 264a or the printing data from the host computer 100 under the receiving standby status, the controlling unit 216 outputs a control signal to the power supply controlling device 250 to operate the printing unit 220.

When the controlling unit 216 is inputted with the power on/off signal from the host computer 100 through the USB interface unit 212 or from the power supply switch 264a, the controlling unit 216 outputs a signal corresponding to the power on/off signal and controls the power supply controlling device 250 so as to supply or interrupt the power necessary for driving the signal processing unit 210 and the printing unit 220.

More specifically, if the controlling unit 216 receives the power-on signal from the host computer 100 through the USB interface unit 212 or from the power supply switch 264a, the controlling unit 216 outputs a low signal corresponding to the power-on signal to the power-on terminal 270 of the power supply controlling device 250. Also, if the controlling unit 216 receives the power off signal from the host computer 100 through the USB interface unit 212 or from the power supply switch 264a, the controlling unit 216 outputs a high signal corresponding to the power off signal to the power off terminal 280 of the power supply controlling device 250.

On the other hand, if the connector of the USB interface unit 212 is disconnected from the host computer 100, the controlling unit 216 determines that there is no power supplied from the host computer 100, and outputs a control signal to interrupt the supply of the power to the terminals 300 and 310 to the power supply controlling device 250.

The controlling unit 216 can reconfirm whether the power supply switch 264a is in the on/off status upon receiving the on/off sensing signal of the power supply switch 264a from the power sensing unit 266.

If the controlling unit 216 determines, through the power sensing unit 266, that the power supply switch 264a is turned off, the controlling unit 216 can perform the control to cause the second switching unit 264b not to be turned on even when the controlling unit 216 is provided with information corresponding to the power-on signal through the USB interface unit 212.

As described in the above, even if the controlling unit 216 is not supplied with the predetermined voltage to drive the signal processing unit 210 through the USB interface unit 212 from the host computer 100, it is possible to control the supply of power to the printer in response to the operation of the power supply switch 264a using the auxiliary power supply 264e.

In accordance with a power supply controlling device of the electronic equipment according to an aspect of the present invention, it is possible to supply or interrupt power to the electronic equipment using a switch, and to overcome a voltage problem of the switch. Furthermore, it is possible to control the power supply by application of an auxiliary power supply even when the driving voltage is not supplied for one of the components to control the electronic equipment from a host computer.

Although a few aspects of the present invention have been shown and described, it would be appreciated by those skilled in the art that changes may be made in this embodiment without departing from the principles and spirit of the invention, the scope of which is defined in the claims and their equivalents.

What is claimed is:

1. A power supply controlling device of an electronic equipment, comprising:
    a first rectifying unit rectifying an alternating voltage supplied from a power supply cord and outputting a first rectified voltage;
    a transformer comprising a primary winding wired to receive the first rectified voltage from the first rectifying unit, and a secondary winding coupled to the primary winding;
    a first switching unit performing an on/off operation by supplying current to the primary winding;
    a pulse width modulating unit controlling the on/off operation of the first switching unit; and
    a power supply controlling unit outputting a signal controlling the pulse width modulating unit, wherein the pulse width modulating unit switches the first switching unit to on/off depending on a reception of a power-on signal which is supplied externally, wherein the power supply controlling unit comprises:
    a USB interface unit;
    a power supply switch selecting a power on/off signal in response to a power on/off signal received from a host computer connected through the USB interface unit and outputting a trigger signal indicative thereof;
    a second switching unit connected to a power supply terminal of the USB interface unit and turned on based on the trigger signal from the power supply switch; and
    a photo coupler comprising a first light emitting device and a phototransistor applying a signal to the pulse width modulating unit, wherein the first light emitting device is connected to the second switching unit and disposed to emit the light in response to the turn-on signal of the second switching unit, and the signal corresponds to an emission of light emitting from the first light emitting device.

2. The device according to claim 1, further comprising:
    a second light emitting device connected in series between the phototransistor and a power supply leading-in terminal and between the power supply cord and the first rectifying unit; and
    a power supply sensing unit receiving the light emitting signal from the second light emitting device to sense the on/off status of the power supply switch.

3. The device according to claim 1, further comprising:
    an auxiliary power supply disposed on a power supply path from the power supply terminal of the USB interface unit to the second switching unit, and supplying the power to the second switching unit.

4. The device according to claim 1, further comprising:
    a second rectifying unit rectifying a voltage induced by the secondary winding of the transformer and outputting a second rectified voltage.

5. The power supply controlling device as in claim 1, wherein the electronic equipment is a printing device.

6. A power supply controlling device, comprising:
a first switching unit;
a pulse width modulating unit;
a power supply switch providing a power on/off signal from a user;
a power supply controlling unit outputting a control signal to the pulse width modulating unit to control the first switching unit to perform an on/off operation corresponding to the power on/off signal from the user or from a host computer by way of a USB interface unit;
a second switching unit performing a turn-on operation according to the power on/off signal; and
a photo coupler connected to the second switching unit, wherein the photo coupler comprises
a first light emitting device to emit a light in response to the turn-on operation of the second switching unit,
a phototransistor to provide the pulse width modulating unit with a signal that corresponds to the emission of the light from the first light emitting device, and
an auxiliary power supply to supply power to the second switching unit.

7. The power supply controlling device according to claim 6, further comprising:
a first rectifying unit rectifying an alternating voltage; and
a transformer comprising a primary winding receiving the rectified voltage from the first rectifying unit and a secondary winding coupled to the primary winding, wherein the pulse width modulation unit controls the first switching unit to perform the on/off operation by controlling the amount of current to the primary winding.

8. The power supply controlling device according to claim 6, wherein the pulse width modulating unit controls a duty ratio of the on/off operation of the first switching unit depending on whether the phototransistor is conducting.

9. The power supply controlling device according to claim 6, wherein when the first light emitting device emits the light in response to the turn-on operation and the phototransistor is turned on according to the light emitted, the pulse width modulating unit generates a predetermined voltage.

10. The power supply controlling device according to claim 6, further comprising:
a second light emitting device, and
a power supply sensing unit receiving the signal from the phototransistor and a signal from the second light emitting device to determine a power on/off status of the power supply switch.

11. The power supply controlling device according to claim 6, further comprising:
a third light emitting device,
wherein when a voltage output from the power supply controlling unit falls below a predetermined target value, the third light emitting device does not emit light and the pulse width modulating unit turns on the first switching unit while controlling a duty ratio of the first switching unit to maintain the voltage outputted from the power supply controlling unit at a predetermined target value.

12. The power supply controlling device according to claim 6, wherein when the power supply controlling unit is in a power-off, the power supply controlling unit is switched into a sleep mode maintaining a receiving standby status until the power supply controlling unit receives printing data or a signal corresponding to the power-on signal.

13. A system connecting a printer and a host computer, comprising:
a signal processing unit comprising a USB interface unit to control the printer;
a printing unit;
a DC/DC converter converting a power supply voltage into a lower voltage required by the signal processing unit, and outputting the converted voltage to the signal processing unit;
an input unit receiving a printing command; and
a power supply controlling device comprising
a first switching unit,
a pulse width modulating unit,
a power supply switch providing a power on/off signal from a user, and
a power supply controlling unit outputting a control signal to the pulse width modulating unit to control the first switching unit to perform an on/off operation corresponding to the power on/off signal from the user, wherein the signal processing unit receives a power-on signal from the host computer through the USB interface unit or from the power supply switch.

14. The system according to claim 13, wherein the signal processing unit further comprises
a storage unit storing printing data and programs to perform printing operations.

15. The system according to claim 14, wherein when the signal processing unit receives the power-on signal from the host computer through the USB interface unit or from the power supply switch, the signal processing unit outputs a low signal corresponding to the power-on signal to the power supply controlling device.

16. The system according to claim 14, wherein when the signal processing unit receives a power off signal from the host computer through the USB interface unit or from the power supply switch, the signal processing unit outputs a high signal corresponding to the power off signal to the power supply controlling device.

17. The system according to claim 14, wherein the USB interface unit connects the printer and the host computer, and comprises a data line carrying printing data from the host computer and a power supply line supplying with a predetermined amount of power to the printer.

18. The system according to claim 13, wherein the first switching unit comprises a field effect transistor (FET) used as a high voltage switching device.

19. The system according to claim 13, further comprising:
a first rectifying unit rectifying an alternating voltage; and
a transformer comprising a primary winding receiving the rectified voltage from the first rectifying unit and a secondary winding coupled to the primary winding, wherein the pulse width modulation unit controls the first switching unit to perform the on/off operation by controlling the amount of current to the primary winding.

20. The system according to claim 13, further comprising:
a second switching unit performing a turn-on operation according to the power on/off signal; and
a photo coupler connected to the second switching unit, wherein the photo coupler comprises
a first light emitting device to emit a light in response to the turn-on operation of the second switching unit,
a phototransistor to provide the pulse width modulating unit with a signal that corresponds to the emission of the light from the first light emitting device, and
an auxiliary power supply to supply power to the second switching unit.

21. The system according to claim 20, wherein when the signal processing unit determines that the power supply switch is turned off and the signal processing unit is provided with information corresponding to the power-on signal through the USB interface unit, the signal processing unit controls the second switching unit to not be turned on.

22. The system according to claim 13, wherein a driving voltage to operate the signal processing unit is +2.5V to +3.3V.

23. The system according to claim 22, wherein the power supply controlling device controls a power supply by applying an auxiliary power supply even when the driving voltage is not supplied.

24. A power supply controlling device, comprising
a first switching unit;
a pulse width modulator unit;
a power supply controlling unit outputting a control signal to the pulse width modulator unit to control the first switching unit to perform an on/off operation corresponding to a power on/off signal received from a host computer connected through a USB interface unit and outputting a trigger signal indicative thereof,
wherein the power supply controlling unit further comprises a second switching unit connected to a power supply terminal of the USB interface unit and turned on based on the trigger signal from the power supply switch.

25. The power supply controlling device of claim 24, wherein the power supply controlling device is installed in a printer body, and wherein the power supply controlling device further comprises a power supply switch placed on an outside of the printer body so that a user can operate the power supply controlling device using the power supply switch to turn the power supply controlling device on/off.

* * * * *